No. 757,669. PATENTED APR. 19, 1904.
C. T. McCARROLL.
CREAM SEPARATOR.
APPLICATION FILED AUG. 11, 1903.
NO MODEL.
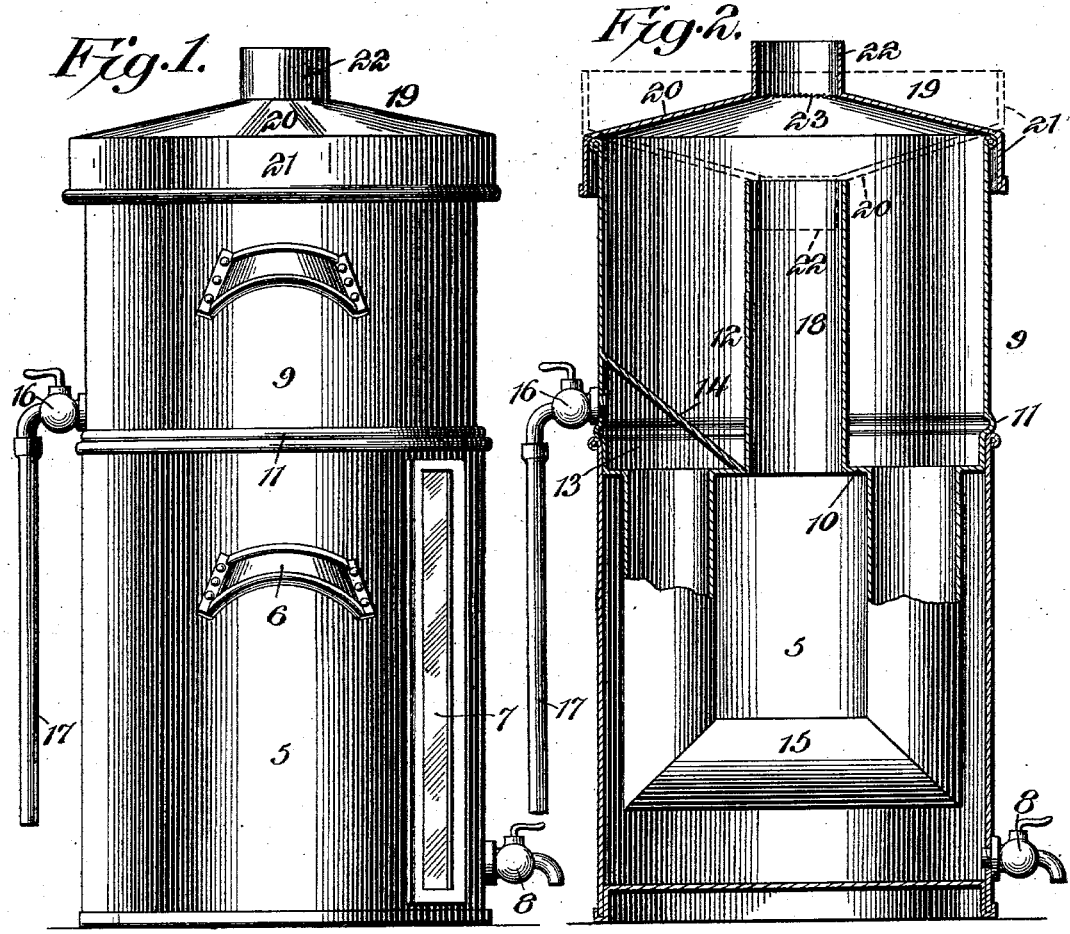
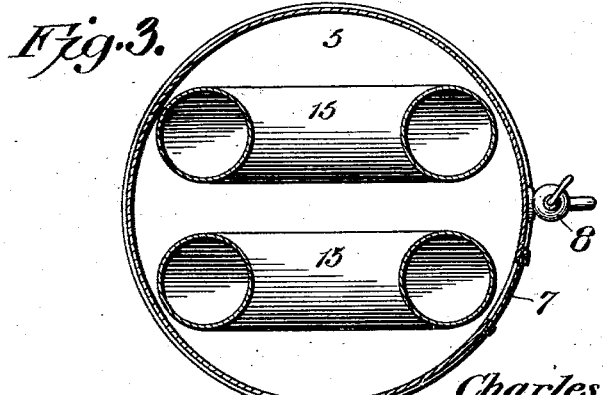
Witnesses
Inventor,
Charles T. McCarroll,
By
Attorney No. 757,669.                                              Patented April 19, 1904.

UNITED STATES PATENT OFFICE.

CHARLES T. McCARROLL, OF OTTUMWA, IOWA.

CREAM-SEPARATOR.

SPECIFICATION forming part of Letters Patent No. 757,669, dated April 19, 1904.

Application filed August 11, 1903. Serial No. 169,137. (No model.)

*To all whom it may concern:*

Be it known that I, CHARLES T. McCARROLL, a citizen of the United States, residing at Ottumwa, in the county of Wapello and State of Iowa, have invented a new and useful Cream-Separator, of which the following is a specification.

This invention relates to that class of separators employing a cooling fluid that is kept separate from the milk, though portions of the structure can be employed for cream separation by that method wherein the water is mixed with the milk.

The principal object of the present invention is to provide a separator wherein an equable temperature can be maintained and sudden changes entirely obviated. At the same time said temperature may be varied at will to suit the condition of the outside temperature.

It is also the object to provide a structure which may be readily and thoroughly cleansed and is easily handled.

An embodiment of the invention which has proven entirely satisfactory is illustrated in the accompanying drawings.

In said drawings, Figure 1 is a side elevation of the separator. Fig. 2 is a longitudinal sectional view through the same. Fig. 3 is a cross-sectional view.

Similar reference-numerals indicate corresponding parts in all the figures of the drawings.

In the embodiment illustrated a milk-receiving vessel 5 is employed, which is preferably cylindrical in form and has an open top. This vessel is provided with suitable handles 6, a transparent gage 7, and a discharge-valve 8.

In connection with the milk-receiving vessel there is employed a water-reservoir, which is in the form of a cylindrical receptacle 9, having a bottom 10, that is adapted to fit snugly within the open top of the milk-receiving vessel and constitutes a cover therefor, the amount of insertion being limited by a bead 11, formed upon the reservoir 9 and adapted to abut against the upper edge of the vessel 5. The interior of the reservoir is subdivided into a main compartment 12 and an inclosed water-receiving compartment 13 by means of an inclined partition-wall 14, extending from the bottom 10 to one of the side walls. Communication between the compartments is obtained through the medium of water-conduits 15 of substantially U shape and depending from the bottom 10, the inlet and exit ends of said conduits communicating, respectively, with the compartments 12 and 13, as illustrated in Fig. 2. Two of these conduits are preferably employed and are arranged in spaced parallel relation, being located entirely within the milk-receiving vessel 5 when the reservoir is in place thereon. An outlet from the water-receiving compartment 13 is provided in the form of a valved faucet 16, which is preferably located just above the bead 11, and is thus disposed above the upper edge of the milk-receiving vessel. To the discharge-nozzle of this faucet is preferably attached a siphon 17, that may be in the form of a rubber or other pipe.

Communication with the interior of the milk-receiving vessel is obtained through an open-ended milk-tube 18, centrally and vertically arranged within the reservoir 9 and extending through the bottom 10. The upper end of this tube preferably terminates short of the upper edge of the reservoir. A cover 19 is employed with the structure, said cover comprising a substantially conical wall 20, provided with a peripheral flange 21 and a central nozzle 22, across which extends a strainer 23. This cover is so constructed that it may be placed over the top of the reservoir with the nozzle uppermost or it may be inverted and the nozzle placed within the upper end of the milk-tube. It may also be employed as a cover for the milk-receiving vessel when the reservoir is removed therefrom.

In using this separator the reservoir is placed upon the milk-receiving vessel and filled with water, after which the cover 19 is inverted and milk poured into the funnel thus formed. This milk will therefore pass through the milk-tube 18 into the receiving vessel. After the milk has been placed within the vessel the water in the reservoir is permitted to pass through the conduit and through the discharge, the rapidity of flow being limited by the valve to suit the temperature and maintain the same at the proper degree for the most efficient separation. Thus on a hot day the water can pass through the separator rapidly, and when cool the flow may be minimized. Warm or cold water may also be employed, according to the season of the year. The open tube 18 permits the free circulation of air over the milk and, moreover, permits the escape of the animal heat. After separation has taken place the milk and afterward the cream are drawn through the faucet 8 in a manner readily understood. The water within the tubes 16 can be almost entirely removed by means of the siphon 17, and thus the separator may be readily handled after separation, as there is no water contained in the reservoir or conduit to increase the weight. If desired, the reservoir may be removed entirely from the milk-receiving vessel, and by using the cover 19 on the latter separation may be obtained by mixing water with the milk. The device has proven itself entirely efficient and satisfactory in the work for which it is intended. It can be readily and thoroughly cleansed, as the parts that depend within the milk-receiving vessel are freely open and accessible.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a cream-separator, the combination with a milk-receiving vessel, of a reservoir constructed to be placed thereon and supported thereby, a water-conduit carried by and in communication with the reservoir, said conduit depending below the bottom of the reservoir and into the milk-receiving vessel, and a milk-tube carried by the reservoir, extending through the same and discharging into the vessel.

2. In a cream-separator, the combination with a milk-receiving vessel, of a water-reservoir constructed to be placed thereon, spaced depending water-tubes carried by the reservoir, and a milk-tube extending vertically through the reservoir and the bottom thereof, said tube being disposed between the water-conduits.

3. In a cream-separator, the combination with a milk-receiving vessel, of a water-reservoir having a bottom, a partition located in the reservoir and extending from the bottom, dividing the interior into separate compartments, a conduit connecting the compartments and located in the milk-receiving vessel, and a water-discharge in communication with one of the compartments.

4. In a cream-separator, the combination with a milk-receiving vessel, of a water-reservoir having a bottom, an inclined partition extending from the bottom to one side thereof, forming an inclosed water-receiving compartment, a conduit connecting the main portion of the reservoir and the water-receiving compartment and depending in the milk-receiving vessel, and a water-discharge in connection with the water-receiving compartment.

5. In a cream-separator, the combination with a milk-receiving vessel, of a water-reservoir having a bottom that fits snugly within the top of the receiving vessel, an inclined partition extending from the bottom of the receiver to one side thereof and forming an inclosed water-receiving compartment, spaced depending water-tubes connecting the reservoir and receiving-compartment, said tubes depending into the milk-receiving vessel, a valved discharge leading from the water-receiving conduit, and a milk-tube extending through the water-conduit and bottom thereof, said tube discharging into the milk-receiving vessel.

In testimony that I claim the foregoing as my own I have hereto affixed my signature in the presence of two witnesses.

CHARLES T. McCARROLL.

Witnesses:
JOHN N. RANDEL,
M. C. PERKINS.